Patent Number: 4,675,584
Date of Patent: Jun. 23, 1987

United States Patent [19]
Kurosawa

[54] CONTROL SYSTEM
[75] Inventor: Ryoichi Kurosawa, Tokyo, Japan
[73] Assignee: Kabushiki Kaisha Toshiba, Kawasaki, Japan
[21] Appl. No.: 739,063
[22] Filed: May 29, 1985
[30] Foreign Application Priority Data
May 30, 1984 [JP] Japan ................ 59-110264
[51] Int. Cl.⁴ .......................... H02P 7/06
[52] U.S. Cl. ................ 318/326; 318/434; 318/345 B; 318/430
[58] Field of Search ............ 318/311, 312, 313, 314, 318/315, 316, 317, 318, 326, 327, 328, 341, 600, 601, 602, 603, 604, 605, 606, 607, 608, 609, 615, 616, 617, 618, 628, 637, 638, 430, 431, 432, 433, 434

[56] References Cited
U.S. PATENT DOCUMENTS

| | | | |
|---|---|---|---|
| 3,649,897 | 3/1972 | Messick | 318/434 |
| 3,775,653 | 11/1973 | Peterson et al. | 318/326 |
| 3,826,961 | 7/1974 | Hayase et al. | 318/327 X |
| 3,916,279 | 10/1975 | Kawano et al. | 318/430 |
| 4,035,698 | 7/1977 | Söderberg | 318/434 X |
| 4,230,979 | 10/1980 | Espelage et al. | 318/721 |
| 4,268,781 | 5/1981 | Kawada et al. | 318/434 |
| 4,268,782 | 5/1981 | Kawada et al. | 318/434 |
| 4,311,951 | 1/1982 | Walker et al. | 318/430 X |
| 4,441,061 | 4/1984 | Yoshida et al. | 318/341 X |
| 4,513,231 | 4/1985 | Kuno et al. | 318/345 B X |

Primary Examiner—William M. Shoop, Jr.
Assistant Examiner—Shik Luen Paul Ip
Attorney, Agent, or Firm—Cushman, Darby & Cushman

[57] ABSTRACT

A control system capable of improving a disturbance response characteristic, includes a control processing unit and a power converter. The control processing unit includes apparatus for (a) providing a signal A equal to a predetermined transfer function $G_X(s)$ of a detected value of a controlled variable n, (b) providing a signal B equal to a transfer function $[1+G_X(s)\cdot G_{LH}(s)]$ of a first command value, and (c) providing, as a second command value, a difference T* between said A and B signals, where $G_{LH}(s)$ is a simulated transfer function which is from T* to n. The power converter controls the controlled variable according to the second command value.

6 Claims, 8 Drawing Figures

CONTROL SYSTEM

BACKGROUND OF THE INVENTION

1. Field of the Invention

This invention relates in general to motor speed control systems. More specifically, the invention provides a control system which is capable of improving a disturbance response characteristic of such a control system.

2. Description of the Prior Art

A control system generally includes a manipulated mechanism that operates a controlled device in accordance with a command value of a manipulated variable, a detector that detects a control variable of the controlled system, and a control processing unit that receives a detected value of the control variable which is the output of the detector and the command value of the control variable so as to produce the command value of the manipulated variable; there has been provided, for example, a motor speed control system using a power converter.

Hereafter, this invention will be described, taking as an example a motor speed control system.

In a motor speed control system, there is generally provided a speed detector coupled to a motor, and the detected speed value derived from the speed detector is compared with a speed command value so that the current of the power converter is controlled, whereby a feedback control is performed.

FIG. 1 (Prior Art) shows a fundamental configuration of a speed control system that controls the speed of a DC motor in a feedback control fashion.

Reference numeral 1 designates a speed control amplifier, 2 a power converter, 3 and 4 armature and field windings, respectively, of a DC motor, 5 a speed detector, and 6 a load of the motor, respectively. A field exciting circuit for field winding 4 of the DC motor is not shown. Power converter 2 includes controlled rectifiers, choppers and a current control circuit that controls an output current I to armature winding 3.

It is assumed that power converter 2 can be regarded as a current amplifier that provides its output current I in accordance with a current command value such as, for example, a torque command value signal T*.

Speed control amplifier 1 receives a speed command value signal n* provided by a reference value setting unit 9 and a detected speed value signal n from speed detector 5. In response to these two input signals, speed control amplifier 1 provides torque command value signal T* corresponding to a torque value required for the motor. In the case of a DC motor, its torque and armature current are proportional to one another, so that the torque command value signal T* is inputted to power converter 2 as the current command value signal.

In response to signal T*, power converter 2 causes current I to flow in armature winding 3 of the motor. In response, the motor produces a torque proportional to the torque command value signal T*, whereby the speed thereof is varied. Speed n is detected by speed detector 5 and fed back to speed control amplifier 1.

The predominant desirable characteristics of a speed control system are such that (a) motor speed can respond rapidly and accurately with respect to changes in the speed command value, (b) motor speed change due to load variation can be kept to a minimum and motor speed can be rapidly restored after a load variation. Characteristic (a) is known as a command value response characteristic, and characteristic (b) is known as disturbance response characteristic. The predominant system component determining such characteristics is speed control amplifier 1.

A conventional speed control amplifer employs a so-called control amplifier such as a proportional control amplifier, a proportional integral control amplifier, or a proportional integral control amplifier with compensation for anti-overshoot.

In addition to these, various control amplifiers are used depending on the respective purposes to which the apparatus is to be applied. These control amplifiers are designed such that the command value response is regarded as being of major importance, and the disturbance response is, in general, slower than the command value response.

FIG. 2 is a view illustrating one example of the command value response and the disturbance response in the case where the proportional integral control amplifier with anti-overshoot compensation is used as a speed control amplifier. In FIG. 2, the abscissa represents time (seconds) and the ordinate a speed n, respectively, and at a time of 0.0 second a speed command is changed from 0 to 1, and at a time of 0.5 second a certain constant load is applied and the response thereat is shown. As shown, the command value response time is approximately 0.1 second while the disturbance response times is approximately 0.3 second, and the ratio of these response time is approximately 3.

The motor speed control system is used, for example, to drive a rolling mill that rolls steel, and in this application, when the steel passes through the rolling mill, there is applied an abruptly drastic load, so that if its disturbance response characteristics were not superior, it would be difficult to ensure uniformity in thickness of the rolled steel, thus superiority of the disturbance response is regarded as being of major importance rather than command value response.

SUMMARY OF THE INVENTION

Accordingly, one object of this invention is to provide a control system having improved disturbance response without deteriorating command value response.

This object is achieved by providing a control system, wherein a control processing unit includes means for providing a signal A equal to a predetermined transfer function $G_x(s)$ of a detected value of a controlled variable, means for providing a signal B equal to a transfer function $(1 + G_x(s) \cdot G_{LH}(s))$ of a first command value, and means for providing, as a second command value, a difference T* between said A and B signal, where $G_{LH}(s)$ is a simulated transfer function from T* to n.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIGS. 6A, 6B, 6C, and FIGS. 7A, 7B, 7C are graphical representations of response characteristics for explaining operations of the invention.

DETAILED DESCRIPTION OF THE PREFERRED EMBODIMENTS

Figure 1:
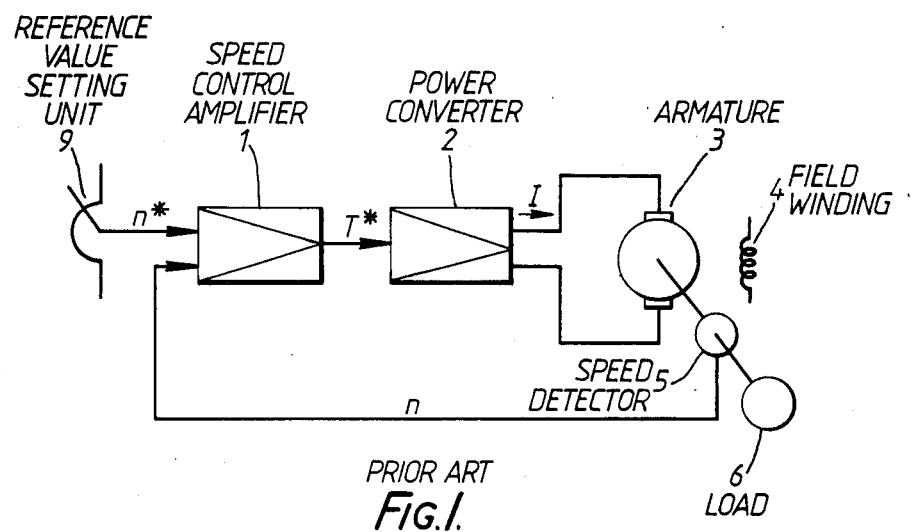
FIG. 1 (Prior Art) is a schematic block diagram of a conventional speed control system.

Referring now to the drawings, wherein like numerals designate identical or corresponding parts throughout the several views, various embodiments of the present invention will be described.

Figure 3:
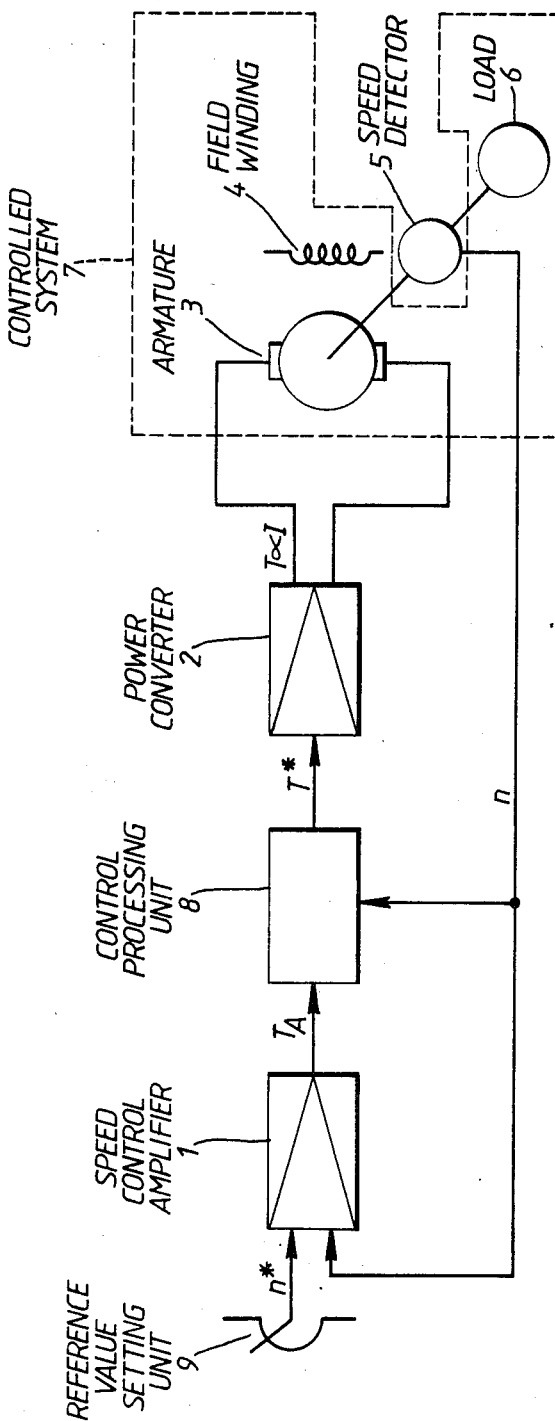
FIG. 3 is a block diagram illustrating an embodiment of the invention.

FIG. 3 is a block diagram of an embodiment of the invention. In essence, the invention comprises the addition of a control processing unit 8 to the speed control system shown in FIG. 1.

Figure 4:
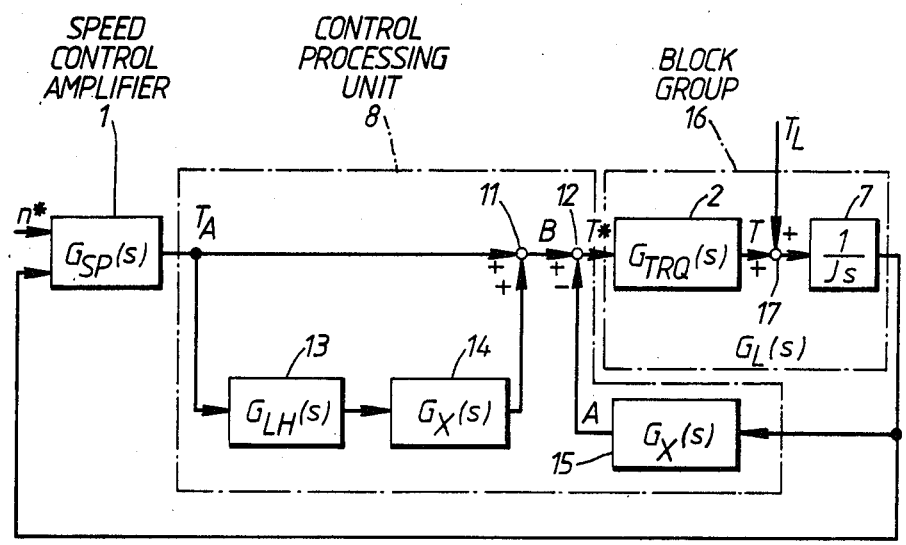
FIG. 4 is a block diagram illustrating the principles of the invention by employing a transfer function representation.

In FIG. 4, the speed control system shown in FIG. 3 is shown in transfer function representation. Reference numerals 11 and 12 represent summation devices. Reference numerals 13, 14 and 15 are transfer function blocks having transfer functions that are represented within the respective blocks. Reference numeral 16 is a block group that represents portions such as a converter, a motor and a load. Reference numeral 2 is a block that represents a transfer function of power converter 2 which is from a torque command value signal T* to a generated motor torque signal T. Reference numeral 17 is a summing junction to which a load torque $T_L$ is applied. Reference numeral 7 is a block representing the sum of the force of inertia of a motor and a load. Reference character J designates the force of inertia, and S a Laplace operator, respectively.

When a transfer function which is from the torque command value signal T* of the block group 16 to the speed signal n is defined as $G_L(s)$, the transfer function $G_L(s)$ can be expressed by the equation (1).

$$G_L(s) = G_{TRA}(s) - 1/J_S \qquad (1)$$

In the conventional arrangement shown in FIG. 1 (Prior Art), there is not provided a control processing unit (such as unit 8), so that the torque command value signal T* equals to the output $T_A$ of the control amplifier 1. The transfer function $G_L(s)$ is also a transfer function which is from the output of the control amplifier 1 in the conventional example to the speed signal n.

Next, a transfer function n(s)/B(s) which is from the input B of the summation device 12 to the speed signal n in the case where the block 15 represented by the transfer function $G_X(s)$ is added is expressed by the equation (2).

$$\frac{n(s)}{B(s)} = \frac{G_L(s)}{1 + G_X(s) \cdot G_L(s)} \qquad (2)$$

Next, a transfer function $B(s)/T_A(s)$ which is from the output $T_A$ of the control amplifier 1 to the above-described B is expressed by the equation (3), where the block 14 has the transfer function $G_X(s)$ which is identical with that of the block 15, and a transfer function of the block 13 is $G_{LH}(s)$.

$$\frac{B(s)}{T_A(s)} = 1 + G_X(s) \cdot G_{LH}(s) \qquad (3)$$

Thus, a transfer function $n(s)/T_A(s)$ which is from the output $T_A$ of the control amplifier 1 to the speed n can be expressed by the equation (4).

$$\frac{n(s)}{T_A(s)} = [n(s)/B(s)] \times [B(s)/T_A(s)] \qquad (4)$$

$$= \frac{1 + G_X(s) \cdot G_{LH}(s)}{1 + G_X(s) \cdot G_L(s)} \cdot G_L(s)$$

Here, if a transfer function $G_{LH}(s)$ of the block is selected to be equal to the transfer function $G_L(s)$, the equation (4) becomes the equation (5).

$$\frac{n(s)}{T_A(s)} = G_L(s) \qquad (5)$$

Therefore, if the transfer function $G_{LH}(s)$ of the block 13 is set to the transfer function $G_L(s)$ which is from the torque command value signal T* to the speed signal n, even when control processing unit 8 according to the present invention is added, the transfer function from output $T_A$ of the control amplifier 1 to the speed signal n is the same as that of the conventional arrangement, and there exists no change in terms of the command value response.

A speed response $n_{LNEW}(s)$ in the case where a load $T_L(s)$ is applied can be obtained as follows. If a transfer function which is from the detected speed value n which is the feedback input of the control amplifier 1 to the output $T_A$ thereof is defined as a transfer function $G_{SP}(s)$, the transfer function $n_{LNEW}(s)$ can be expressed by the equation (6).

$$n_{LNEW}(s) = \frac{\frac{1}{J_S}}{1 + G_{SP}(s) \cdot G_L(s)} \cdot \frac{1}{1 + G_X(s) \cdot G_L(s)} \cdot T_L(s) \qquad (6)$$

A speed response $n_{LOLD}(s)$ in the conventional arrangement (FIG. 1) can be obtained when assuming that $G_X(o) = 0$ in the equation (6), and can be expressed by the equation (7).

$$n_{LOLD}(s) = \frac{\frac{1}{J_S}}{1 + G_{SP}(s) \cdot G_L(s)} \cdot T_L(s) \qquad (7)$$

Therefore, when compared to the conventional example, the disturbance response according to the present invention is changed only by the equation (8).

$$\frac{1}{1 + G_X(s) \cdot G_L(s)} \qquad (8)$$

Thus, if the transfer function $G_X(s)$ is appropriately selected, the disturbance response can be improved while the command value response is not affected.

The transfer function $G_X(s)$ can be basically arbitrarily selected. However, it should be selected within such an extent that the transfer function expressed by the equation (8) does not have unstable or oscillatory components.

Figure 5:
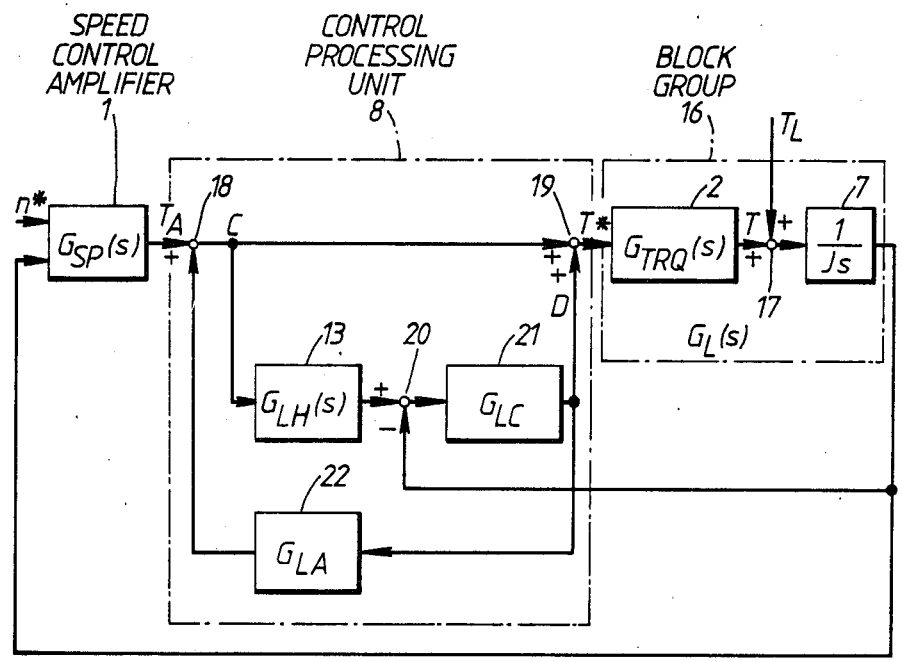
FIG. 5 is a block diagram illustrating an embodiment of a speed control system according to the invention.

In FIG. 5, there is shown a specific embodiment of the present invention. This embodiment is an example such that improvement in the preferable disturbance response can be acquired, in addition, its setting adjustment can be readily made. Control processing unit 8 is the portion particularly added according to the present invention. Reference numerals 18, 19 and 20 designate summation devices, 13 a simulated transfer function block which includes the transfer function $G_{LH}(s)$ that simulates the transfer function $G_L(s)$ which is from the torque command value signal T* identical with the aforementioned to the speed n, and 21, 22 coefficients blocks that multiply the respective input values by the respective coefficients (such as $G_{LC}$, $G_{LA}$) represented within the respective blocks, respectively.

A signal D which is the output of the coefficients block 21 is fed into the coefficient block 22 so as to be multiplied by the coefficients $G_{LA}$, and the thus multiplied signal and the output $T_A$ of the control amplifier 1 are fed into the summation device 18 so as to be processed in subtraction producing a signal C. The signal C is then fed into the simulated transfer function block 13, and the output thereof and the detected speed value n are fed into the summation device 20 so as to be processed in subtraction. The output of the summation device 20 is fed into the coefficient block 21 so as to be multiplied by the coefficient $G_{LC}$ producing the signal D. On the other hand, the signal C is fed, together with the signal D, also into the summation device 19 so as to be processed in addition producing the torque command value signal T*.

In general, a transfer function $G_{TRQ}(s)$ represented by the block 2 which is from the torque command value signal T* to a generated motor torque signal T can be approximated by a first-order lag transfer function, and a transfer function $1/J_S$ represented by the block 7 which is determined by the force of inertia J signifies integration, so that in order to realize the transfer function $G_{LH}(s)$ of the simulated transfer function block 13, a first-order lag circuit (equivalent to a low pass filter) and an integrator are appropriate to be employed.

If the above-described configuration is modified into the principle block diagram of FIG. 4, the transfer function $G_X(s)$ can be expressed by the equation (9).

$$G_X(s) = \frac{(1 - G_{LA})G_{LC}}{1 + G_{LA} \cdot G_{LC} \cdot G_{LH}(s)} \quad (9)$$

Assuming that the coefficient $G_{LA}$ is zero, the transfer function $G_X(s)$ becomes a mere coefficient $G_{LC}$, and this permits a simplest configuration of the present invention.

Advantages derived from the aforementioned configuration will be described on the basis of experimental results.

Figure 6A:
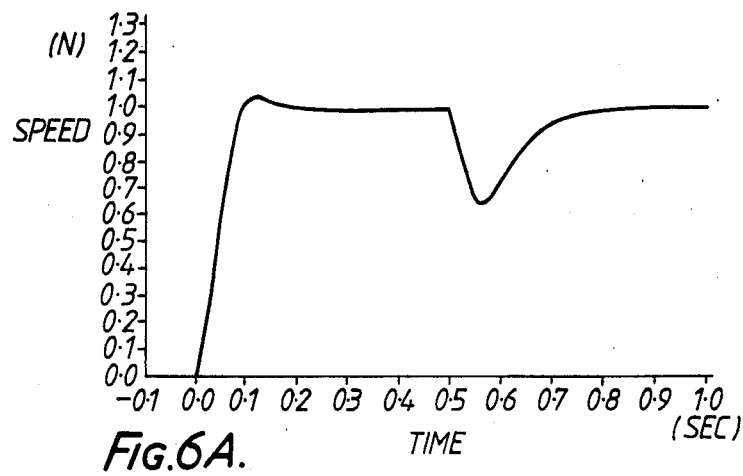
Figure 6B:
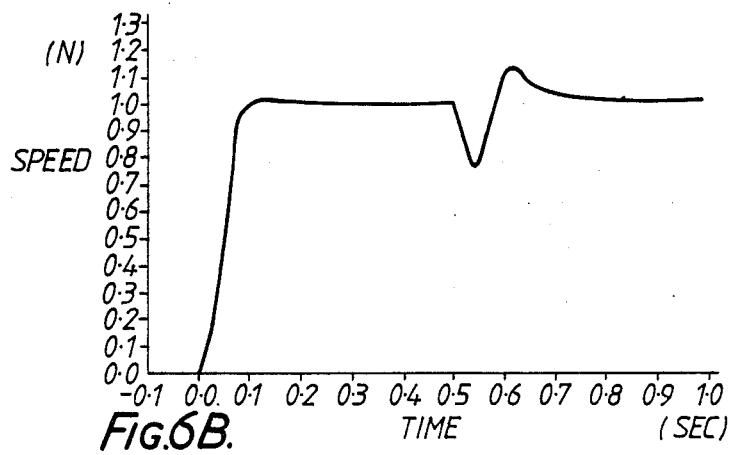
Figure 6C:
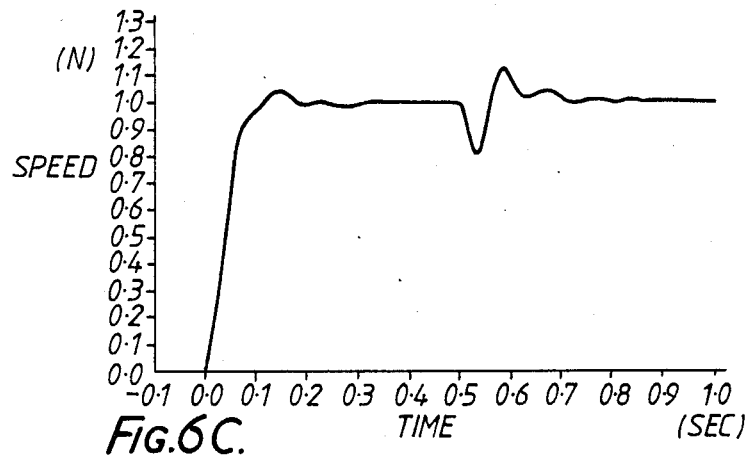

FIGS. 6 (a)-6(c) are diagrams illustrating comparisons of responses in the case where the coefficient $G_{LA}$ is defined as zero and the coefficient $G_{LC}$ is varied. Responses are measured under the condition in which the speed command value is changed from 0 to 1 at a time of 0.0 second, and then at a time of 0.5 second a constant load is applied. In FIGS. 6(a)-6(c), the abscissa represents time (seconds), and the ordinate represents speed n.

Figure 2:
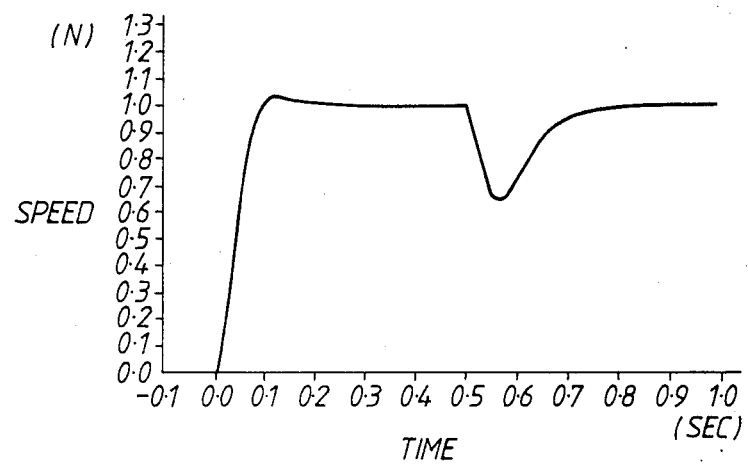
FIG. 2 (Prior Art) is a graph representation of a response characteristic of a conventional speed control system.

FIG. 6(a) shows the response in the case where the coefficient $G_{LC}=0$, i.e., the response in the conventional example identical with that of FIG. 2. FIG. 6(b) shows the response in the case where the coefficient $G_{LC}$ is set to the value being regarded as an optimum value. FIG. 6(c) shows the response in the case where the coefficient $G_{LC}$ is set to a value greater than the optimum value, and there exist oscillatory phenomena, and it can be seen that the setting is inappropriate.

As shown in the experimental results, the adjustments for the optimum response are made such that first, the coefficient $G_{LA}$ is set to zero and then the coefficient $G_{LC}$ is increased to the point immediately before an oscillatory phenomenon appears. This can reduce the speed decrease that inevitably occurs upon the disturbance response, however, overshooting appears when the speed recovers, so that next, the coefficient $G_{LA}$ is increased until the overshooting disappears, whereby the optimum response can be readily achieved.

When comparison is made between the responses of the conventional arrangement and the present invention, it is understood that only the disturbance response is improved with substantially no change in the command value response. The speed decrease upon the disturbance response is reduced to 70%, and the response time until the instant at which the speed recovers is shortened to 30%, in addition, the ratio of the command value response time and the disturbance response time is approximately 1, and advantages derived from its improvement is extremely great.

Another advantage of the present invention is that the command value response change with respect to variations in the force of inertia of the load can be reduced. For example, when the inertia is increased, greater torque is required to accelerate, however, the response change can be suppressed similarly to the case where the load torque is applied to this increment of the load. Further, this means that even when the transfer function of the simulated transfer function block which is required for the present invention differs from the actual value to some extent, the advantages of the present invention can be exhibited, so that the simulated transfer function is free from strict preciseness, consequently the implementation thereof can be readily achieved.

In addition, even when a resonant system is constituted between the motor and the load, variations in the torque caused by resonance can be suppressed as variations in the load. For example, in the case of an elevator system, there is installed a lifting rope that constitutes a resonant system between the lifting motor and the cage which is a load, whereby the ride comfort of passengers is deteriorated, however, this can also be suppressed by utilizing the embodiment according to the present invention as an extremely effective countermeasure.

Although the hereinbefore description has been made as to the case where the DC motor is controlled with the constant field, similarly other applications can also be implemented in such a manner that when varying the field, between the torque command value converter and the current command, there is additionally provided a variable coefficient block that corresponds to variations in the field, or that when controlling an AC motor, there is additionally provided a block group that calculates so as to derive an AC current command value from the torque command value. Furthermore, the present invention is not limited to, in terms of a controlled system, the motor speed control system.

Obviously, numerous modifications and variations of the present invention are possible in light of the above teachings. It is therefore to be understood that within the scope of the appended claims, the invention may be practiced otherwise than as specifically described herein.

What is claimed is:

1. A control system, comprising:
    detector means for detecting a value n of a controlled variable;
    means for producing a reference value;
    control amplifier means, connected to receive said detected value n and said reference value, for producing a first command value for reducing a difference between the detected value and said reference value;
    control processing means, connected to receive said detected value n and said first command value for producing a second command value, said control processing means including means (a) providing a signal A equal to a predetermined transfer function $G_X(s)$ of said detected value n, (b) providing a signal B equal to a transfer function $(1+G_X(s) \cdot G_{LH}(s))$ of said first command value, and (c) providing, as said second command value, a difference T* between said A and B signals; and
    power converter means for controlling said controlled variable according to said second command value, where $G_{LH}(s)$ is a simulated transfer function which is from T* to n.

2. A motor speed control system, comprising:
    speed detector means for detecting the speed of a motor and providing a detected speed value corresponding thereto;
    means for producing a reference speed value;
    speed control amplifier means, connected to receive said detected speed value and said reference speed value, for producing a first command value for reducing a difference between the detected speed value and said reference speed value;
    control processing means, connected to receive said detected speed value and said first command value, for producing a second command value, said control processing means including means (a) for providing a signal A equal to a predetermined transfer function $G_X(s)$ of said detected value, (b) providing a signal B equal to a $(1+G_X(s) \cdot G_{LH}(s))$ of said first command value, and (c) providing, as said second command value, a difference T* between A and B signals; and
    power converter means for controlling said speed of the motor according to said second command value, where $G_{LH}(s)$ is a simulated transfer function which is from T* to n.

3. A control system according to claim 1, wherein said predetermined transfer function $G_X(s)$ is a transfer function that can be expressed by $$\frac{(1 - G_{LA})G_{LC}}{1 + G_{LA} \cdot G_{LC} \cdot G_{LH}(s)}$$

where $G_{LA}$ and $G_{LC}$ are defined as predetermined coefficients.

4. A motor speed control system according to claim 2, wherein said predetermined transfer function $G_X(s)$ is a transfer function that can be expressed by $$\frac{(1 - G_{LA})G_{LC}}{1 + G_{LA} \cdot G_{LC} \cdot G_{LH}(s)}$$

5. A motor speed control system according to claim 2, wherein said motor is an AC motor.

6. A motor speed control system according to claim 2, wherein said motor is a DC motor.

* * * * *